United States Patent [19]

Langworthy

[11] Patent Number: 4,654,698
[45] Date of Patent: Mar. 31, 1987

[54] COLOR SENSOR USING DICHROIC MIRRORS TO DISPLACE COMPONENTS

[75] Inventor: Harold F. Langworthy, Webster, N.Y.

[73] Assignee: Eastman Kodak Company, Rochester, N.Y.

[21] Appl. No.: 851,746

[22] Filed: Apr. 14, 1986

Related U.S. Application Data

[63] Continuation of Ser. No. 621,348, Jun. 18, 1984, abandoned.

[51] Int. Cl.$^4$ .......................... H04N 9/07; H04N 9/04
[52] U.S. Cl. ........................................ 358/43; 358/41; 358/55; 358/44
[58] Field of Search ...................... 358/43, 55, 41, 44, 358/49, 75

[56] References Cited

U.S. PATENT DOCUMENTS

| 4,496,967 | 1/1985 | Sase et al. | 358/44 |
| 4,580,160 | 4/1986 | Ochi et al. | 358/44 |

FOREIGN PATENT DOCUMENTS

| 54-154348 | 5/1979 | Japan | 358/75 |
| 58-182365 | 10/1983 | Japan | 358/75 |
| 59-61267 | 4/1984 | Japan | 358/75 |

Primary Examiner—James J. Groody
Assistant Examiner—Robert Michael Bauer
Attorney, Agent, or Firm—Thomas H. Close

[57] ABSTRACT

Apparatus for producing a color image signal having first and second color components, comprises an image sensor having a regular array of image sensing elements with a regular array of first and second colored filter elements registered thereon for producing a sampled color image signal having first and second color components, a lens for forming a color image on the image sensor, an optical device for displacing the first color component of the image with respect to the second color component by an amount equal to an integral number of image sensing elements such that neighboring image sensing elements having first and second colored filter elements sample the same portion of the image, and a delay device for synchronizing the color components of the image by delaying the first color component with respect to the second color component of the sampled color image signal produced by the image sensor by an integral number of image sensing element sample periods corresponding to the displacement of the first color component with respect to the second color component. The image produced from the resulting signal is free from color fringing.

5 Claims, 14 Drawing Figures

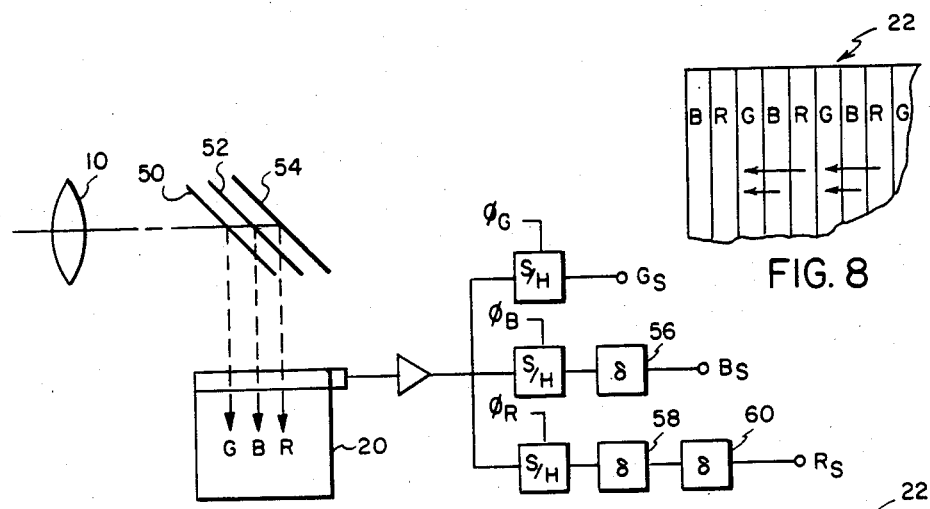
FIG. 7
FIG. 8
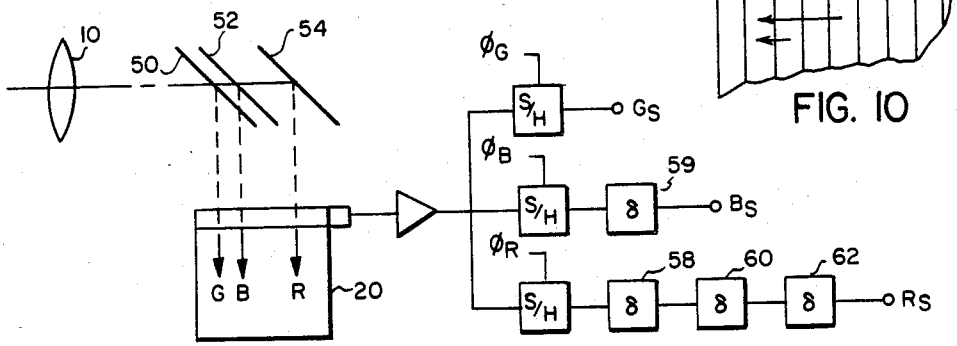
FIG. 9
FIG. 10
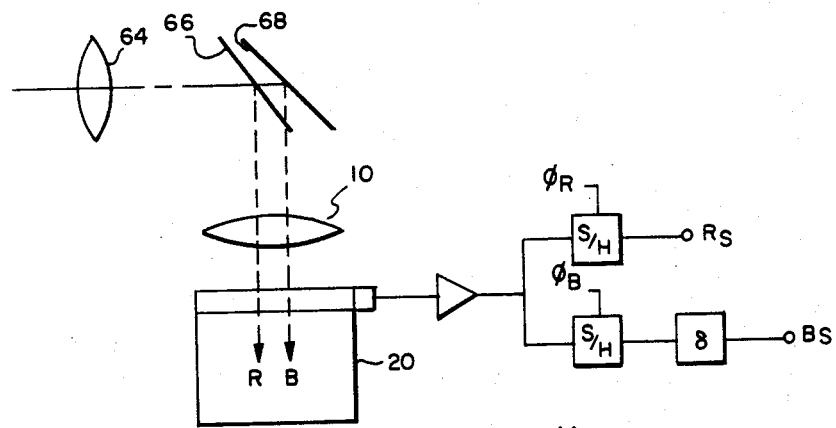
FIG. 11

COLOR SENSOR USING DICHROIC MIRRORS TO DISPLACE COMPONENTS

This is a continuation of U.S. patent application Ser. No. 621,348, filed June 18, 1984 now abandoned.

TECHNICAL FIELD

The present invention relates to apparatus for producing a sampled color image signal having first and second color components, of the type having a regular array of first and second colored filter elements registered on a regular array of image sensing elements in an image sensing device.

BACKGROUND ART

FIG. 1 shows apparatus for producing a color image signal that is exemplary of the prior art. For example, see "CCD Digital Color Camera" by Nagumo et al, IEEE Transactions on Consumer Electronics, August, 1980 Vol. CE-26, No. 3, page 339. An image, formed by lens 10, is separated into a green (luminance) component and a red/blue (chrominance) component by a dichroic mirror 12 positioned between a pair of prism blocks 14 and 16. The green image component is passed by dichroic mirror 12 and falls on a solid state image sensor 18, for example a charge coupled device (CCD) image sensor having a regular array of image sensing elements. The output of solid state image sensor 18 is amplified by an amplifier 17 and sampled by a sample and hold circuit 19 to produce a signal $G_S$ representing the green component of the image.

The output of the CCD image sensor 18, from amplifier 28, is a time varying waveform including undesirable clock and reset noise signatures, and a momentary level during each sample readout period representing the desired image sample value. The sample and hold circuit is clocked at the proper moment by clock signal $\phi_G$ to capture and hold this signal level until the next sample is read out. The red/blue component of the image is reflected by dichroic mirror 12 and prism block 14 and falls on a solid state image sensor 20.

The solid state image sensor 20 is provided with a regular array of first and second colored filter elements (for example, a striped filter 22 as partially shown in FIG. 2) having alternate red and blue filter elements to separate the red/blue component of the image into a red chrominance component and blue chrominance component. The word "regular" means that the image sensing elements and the color filter elements occur at uniform spacings in the array. The filter array is registered on the solid state image sensor 20 so that the filter elements are aligned with the columns of image sensing elements on the image sensor. The word "registered" means that the filter array is physically attached to the surface of the sensor, or that the image of the filter array is optically projected onto the surface of the image sensor.

The output of solid state image sensor 20 is amplified by amplifier 28 and sampled by sample and hold circuits 30 and 32 clocked by clock signals $\phi_R$ and $\phi_B$ respectively, to provide a signal $R_S$ representing the red chrominance component of the image, and a signal $B_S$ representing the blue chrominance component of the image. The sample and hold circuits 30 and 32 function not only to recover the image sample signals from the noisy output of the image sensor, but also to demultiplex the separate color component signals from the output of the image sensor.

For display on an R, G, B color monitor, the sampld analog signal components $R_S$, $B_S$ and $G_S$ of the color signal may be low pass filtered and applied directly to the color monitor. For display on a standard color television receiver, the sampled analog signal components $R_S$, $B_S$ and $G_S$ of the sampled color image signal produced by the camera are processed in an NTSC encoder. The green component $G_S$, which has twice the sample rate of the blue and red components ($B_S$ and $R_S$) is employed to produce the high resolution luminance component (Y) of the NTSC signal, and a subsampled version (e.g. every other sample) of the green signal component is employed with the red and blue components of the image signal to produce the chrominance (I and Q) components of the NTSC signal.

The response of the prior art solid state image sensor 20, with color filter array 22, to a component of scene detail, for example a vertical white stripe on a dark background, is illustrated schematically in FIG. 3. The line labeled W in FIG. 3 represents the brightness profile of a vertical white strip falling across a horizontal line of image sensing elements in the solid state image sensor 20. The vertical columns labeled "RBRB..." in FIG. 3 represent the red and blue filter elements registered on alternate image sensing elements in the solid state image sensor. The line labeled $R_S$ in FIG. 3 is the signal representing the sampled red chrominance component of the white striped image, and the line labeled $B_S$ is the signal representing the sampled blue chrominance component of the image. As can be seen in FIG. 3, the $R_S$ and $B_S$ signals have different amplitudes in areas where the brightness of the image is changing, i.e. at the edges of the white stripe. The areas where the signals differ have been indicated by the cross-hatched regions labeled 34 in FIG. 3. When the color image signal is displayed, the differences in the red and blue chrominance components of the signal at the edges of the stripe causes undesirable color fringing to appear in the image.

The object of the present invention is to provide apparatus for producing a color image signal having first and second color components, of the type having an image sensor with a regular array of first and second colored filter elements registered on a regular array of image sensing elements, that produces a color image signal free from such color fringing.

DISCLOSURE OF THE INVENTION

The apparatus according to the invention is characterized by having an optical device for displacing a first color component of the color image with respect to a second color component by an amount equal to an integral number of image sensing elements such that neighboring image sensing elements having first and second colored filter elements sample the same part of the image, and a delay device for synchronizing the color components of the image by delaying the first color component of the sampled color image signal produced by the image sensing device with respect to the second color component by an integral number of sensing element sample periods corresponding to the displacement of the first color component with respect to the second color component.

According to a preferred embodiment of the invention, the optical device comprises a pair of spaced apart dichroic filters positioned in the optical path of the apparatus between an objective lens and the image sensor. According to another embodiment of the invention, the optical device comprises a color separation grating.

In an application of the invention to apparatus with an image sensor having three colors of filter elements, the optical device comprises a third mirror spaced apart from said first and second mirrors for relatively displacing a third color component of the image such that neighboring image sensing elements having first and third colored filter elements sample the same part of the image; and the delay device includes means for synchronizing the third color component of the signal with the first and second color components.

BRIEF DESCRIPTION OF THE DRAWINGS

FIG. 7 is a schematic diagram illustrating another example of the present invention employed in apparatus having a three color image sensing device;

FIG. 8 is a partial detail view showing a color filter array pattern employed with the apparatus shown in FIG. 7;

FIG. 9 is a schematic diagram showing another example of the present invention employed in apparatus for producing a color image signal;

FIG. 10 is a partial detail view showing a color filter array pattern used with the apparatus shown in FIG. 9;

FIG. 11 is a schematic diagram showing another example of the present invention employed in apparatus for producing a color image signal;

MODES OF CARRYING OUT THE INVENTION

Figure 1:
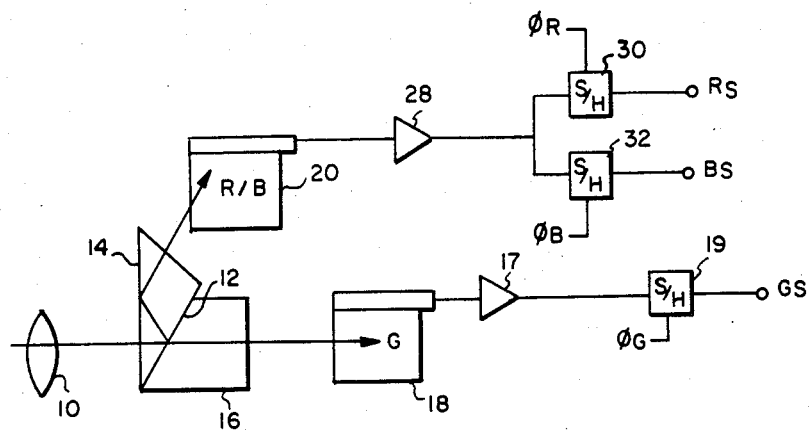
FIG. 1 is a schematic diagram representative of prior art apparatus for producing a color image signal.
Figure 2:
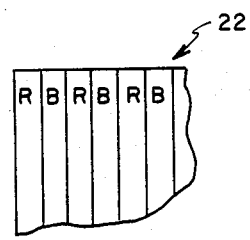
FIG. 2 is a partial detail view showing a color filter array pattern employed with the apparatus shown in FIG. 1.
Figure 3:
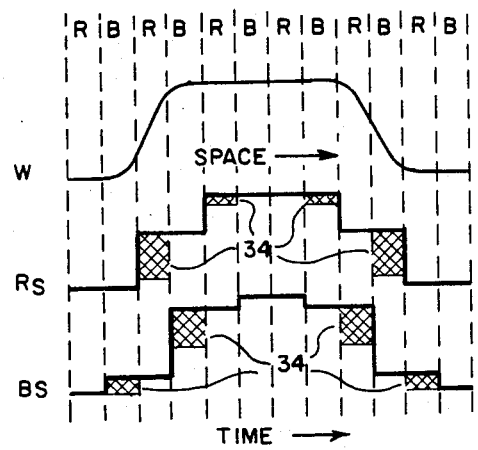
FIG. 3 is a diagram useful for explaining the operation of the apparatus shown in FIG. 1.
Figure 4:
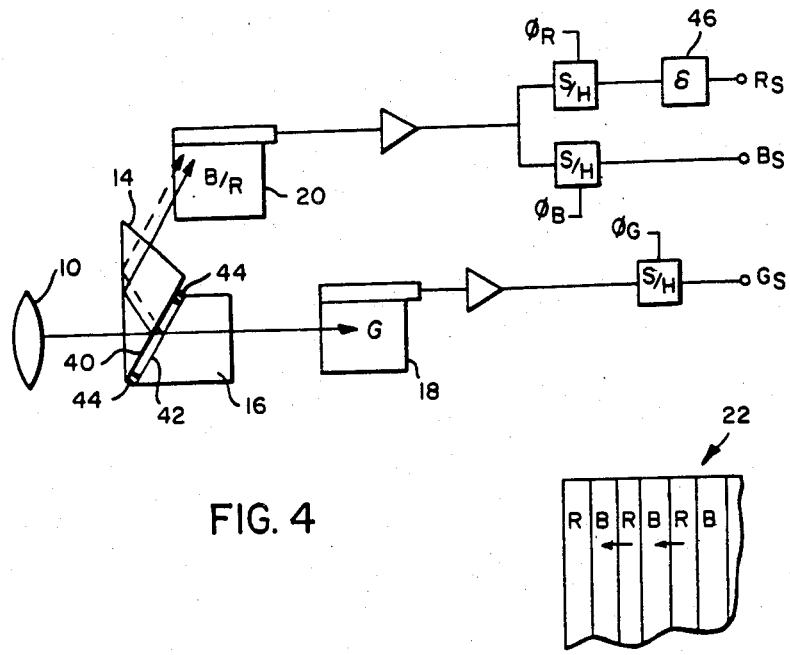
FIG. 4 is a schematic diagram showing apparatus embodying the present invention.
Figure 5:
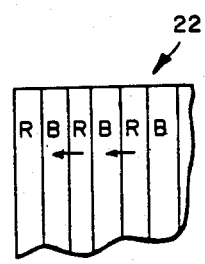
FIG. 5 is a partial detail view showing a color filter array pattern employed with the apparatus shown in FIG. 4.

FIG. 4 illustrates an example of this invention employed in apparatus for producing a color image, of the type shown in FIG. 1. Similar elements in the apparatus are numbered the same. An optical device comprising a pair of spaced apart dichroic mirrors 40 and 42 separates the image into a green (luminance) component that is transmitted to solid state image sensing device 18 and red and blue (chrominance) components that are reflected to solid state image sensing device 20 which is provided with a color filter array 22, partially shown in FIG. 5. Dichroic mirror 40 reflects the red component of light and transmits blue and green components. Dichroic mirror 42 reflects the blue component of light and transmits the green component. Dichroic mirrors 40 and 42 are spaced apart by spacers 44. The spacing is sufficient to displace the red component of the image horizontally with respect to the blue component by an amount equal to one image sensing element. As a result, the pairs of neighboring image sensing elements having red and blue filter elements receive light from the same part of the image. This has the effect of displacing the columns of image sensing elements having red filters so that they overlap the columns of image sensing elements having blue filters at shown by the arrows in FIG. 5.

Figure 6:
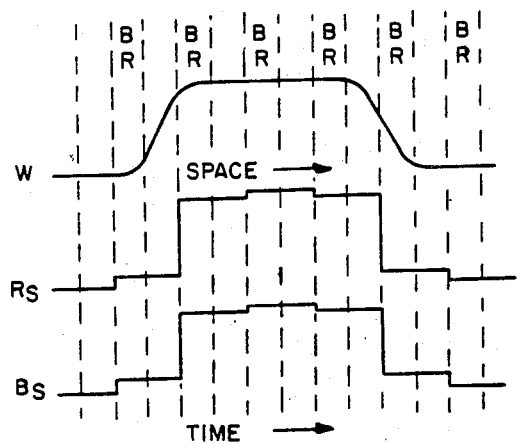
FIG. 6 is a diagram useful in describing the operation of the apparatus shown in FIG. 4.

The displacement of the red component of the image with respect to the blue component causes the red and blue components of the signal produced by the image sensor 20 to be out of synchronization. If the image signal, as produced by the image sensor, were displaying directly, the red component of the image would be displaced from the blue component by one image sensing element. To compensate for this, the output circuitry for the solid state image sensing device 20, is provided with a one-sample time delay 46 for delaying the red component of the image signal by an amount sufficient to synchronizing the red and blue components of the image signal. In general, to synchronize the color components of the image signal, the color component of the image signal that is shifted closer to the output of the image sensor by an integral number of image sensing elements, should be delayed by the same number of image sensing element sample periods. FIG. 6 shows the chrominance signals $R_S$ and $B_S$, produced by the image sensing apparatus when viewing a vertical white strip on a dark background. As indicated in FIG. 6 by vertical columns labeled , neighboring pairs of samples of the blue component and the red component of the image are taken from the same part of the image. After the time delay to synchronize the color components of the image signal, the $R_S$ and $B_S$ signals are identical. As can be seen from FIG. 6, the present invention is advantageous in that the color fringes in the chrominance signal in areas of the image where brightness is changing, are eliminated.

FIG. 7 shows apparatus having a single image sensing device 20 with a three-color stripe filter 22 (a portion of which is shown in FIG. 8). With the filter pattern shown in FIG. 8, the green (luminance) component of the image is sampled at the same rate as the red and blue components. The present invention is applied in this embodiment to cause three neighboring image sensing elements having different colored filter elements (red (R), green (G) and blue (B)) to receive light from the same part of the image.

In the embodiment shown in FIG. 7, three spaced apart mirrors 50, 52 and 54 are employed to shift the three color components of the image with respect to each other. The first mirror 50 is a dichroic mirror that reflects the green component of light and passes the red and blue components. The second mirror 52 is a dichroic mirror that reflects the blue component of the light and passes the red component. The third mirror 54 is a fully silvered mirror that reflects the red component of light to the image sensor. The mirrors are spaced apart such that the red component of the image is displaced with respect to the green component by two image sensing elements. The blue component of the image is displaced with respect to the green component by one image sensing element. The arrows in FIG. 8 indicate the relative shifts between the color components of the image, that are effected by the arrangement of mirrors 50, 52, and 54.

In FIG. 7, and in the examples to follow, only the reflective surfaces (mirrors 50, 52, 54, etc.) are shown. It is to be understood that these surfaces are supported by the faces of prisms as in FIG. 4, or by the surfaces of transparent sheets. In the output electronics of the apparatus, the signal representing the blue component of the image is electronically delayed in time by one image sensing element sample periods by a time delay element 56, to synchronize the blue component of the image signal with the green component. The signal representing the red component of the image is delayed by two image sensing element sample periods by time delay elements 58 and 60 to likewise synchronize the red component with the green component. The embodiment of the invention shown in FIG. 7 is advantageous in that the output of the apparatus is free from color fringing in all three colors.

FIG. 9 shows apparatus having a single image sensing device 20 with a color filter array 22 (partially shown in FIG. 10) of the type having a green filter stripe over alternate columns of the image sensor, interspersed with red and blue filter stripes. In this pattern, the green (luminance) component of the image is sampled at twice the rate of the red or blue component. In this embodiment, mirror 54 is displaced farther away from mirror 52 than in the embodiment shown in FIG. 7 so as to shift the red color component of the image by the width of three image sensing elements, as shown by the arrows in FIG. 10. The signal representing the red component of the image is electronically shifted in time by three image sensing element time periods by one elementdelays 58, 60 and 62 to synchronize the red component of the image signal with the green component. Similarly, the blue component of the image signal is delayed by one image sensing element time period to synchronize it with the green and red components of the signal.

In the examples discussed above, the optical device for shifting the color components of the image with respect to each other was positioned between an objective lens 10 and the image sensing device 20. FIG. 11 shows apparatus having a relay lens 64 and an objective lens 10. The optical device for effecting the shift between color components, comprising dichroic mirrors 66 and 68, are positioned between the relay lens 64 and the objective lens 10, and are angled with respect to each other to effect the shift of one color component with respect to the other.

Figure 12:
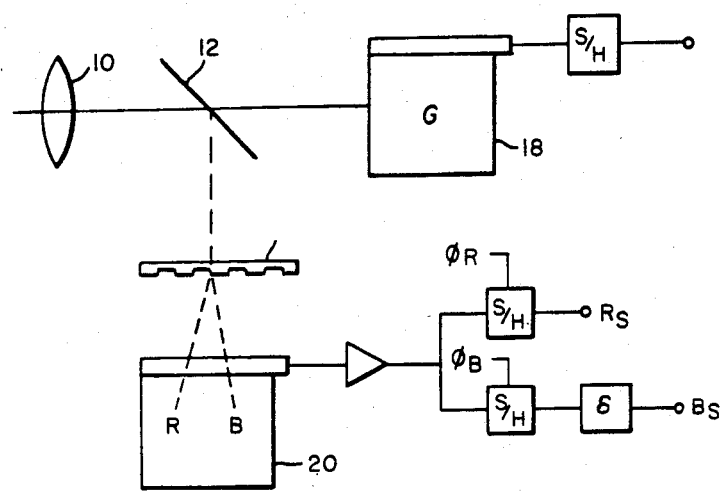
FIG. 12 is a schematic diagram showing another example of apparatus employing the present invention.

FIG. 12 illustrates another optical device for effecting the shift of one color component with respect to another. In this example, a dichroic mirror 12 separates the image into a green component that is passed to image sensing device 18, and a blue/red component that is passed to an image sensing device 20. The image sensing device 20 is provided with red and blue vertical color stripe filter array of the type shown in FIG. 5.

The blue and red components of the image are displaced with respect to each other by a color separation grating 70. The color separation grating is of the type comprising a blazed synthetic phase-only hologram that separates the incoming light into three central diffraction orders ($-1$, 0, and $+1$). Blue light is selectively diffracted into the $-1$ order and red light is selectively diffracted into the $+1$ order, thereby effecting the color displacements. A theoretical analysis of such color separation gratings is given in the article "Color Separation Gratings" by H. Damman in *Applied Optics*, Vol. 17, No. 15, Aug. 1, 1978, page 2273.

The present invention can also be employed with an image sensing device having a color filter array with a checkerboard pattern of colored filter elements, where the color of the filter elements alternates in two dimensions.

Figure 13:
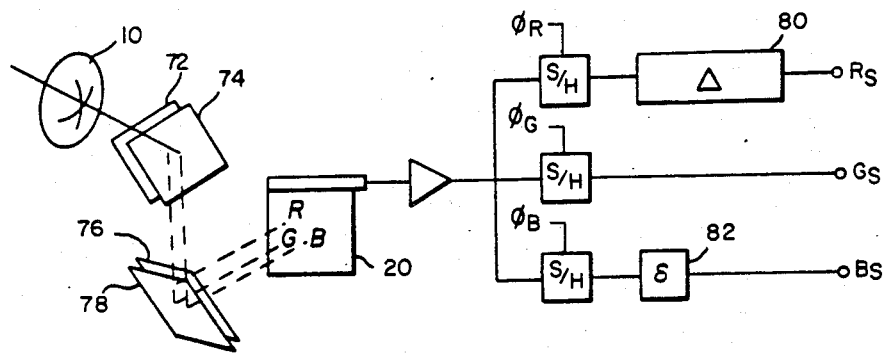
FIG. 13 is a schematic diagram showing another example of apparatus employing the present invention having an image sensing device with a color filter array having a checkerboard type pattern.
Figure 14:
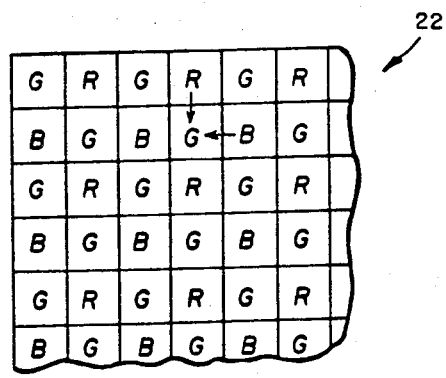
FIG. 14 is a partial detail view showing the checkerboard filter array pattern used with the apparatus shown in FIG. 13.

FIG. 13 shows a color apparatus having a solid state image sensing device 20 with a checkerboard type color filter array 22 registered thereon. A portion of the color filter array 22 is shown in FIG. 14. As seen from FIG. 14, the colors of the filter elements in the array alternate in two dimensions, vertically and horizontally. The optical device shifts the red color component of the image with respect to the green component in a vertical direction by one image sensing element, and shifts the blue component of the image with respect to the red and green components in a horizontal direction by one image sensing element. The effect is to displace the red and blue image sensing elements as shown by the arrows in FIG. 14.

To accomplish the color component spatial shifts in two dimensions, a first dichroic mirror 72 positioned at an angle to the optical path, reflects red and green light and passes blue light. A mirror 74 parallel to and spaced from the dichroic mirror 72 reflects the blue light and shifts the blue component of the image with respect to the red and green components. A second dichroic mirror 76 positioned at an angle to the optical path and rotated 90° from the first set of mirrors, reflects red light and passes blue and green light. A mirror 78 parallel to and spaced from the dichroic mirror 76 reflects the blue and green light passed by dichroic mirror 76 to effect a displacement between the red component of the image and the green and blue components.

The signal representing the red component of the image is electrically delayed by one line scan time $\Delta$ by an electronic delay device 80, and the signal representing the blue component is delayed by one image sensing element time $\delta$ by electronic delay device 82 to synchronize all three components of the image signal. The apparatus is advantageous in that the resulting color signal produced by the apparatus is free from color fringing caused by the spacing of the color filters in the filter array.

In the examples noted above, the time delay elements employed to synchronize the color components of the color image signal are located after the sample and hold circuits. In this location, the delay elements may take the form of analog shift registers.

INDUSTRIAL APPLICABILITY AND ADVANTAGES

According to the present invention, as has been explained above, apparatus for producing a color image signal, having an image sensing device with a regular array of color filter elements registered thereon, is provided with an optical device for spatially shifting one color component of the image with respect to another color component so that neighboring image sensing elements having differently colored filter elements view the same part of the image. The color signals produced by the image sensing device are electronically delayed by a corresponding number of image sensing element time periods to synchronize the color components of the image signal. The invention is beneficial in that color fringing in an image resulting from the signals produced by the apparatus is eliminated.

I claim:

1. Apparatus for producing a sampled color image signal having first and second sampled color components, comprising:

an image sensor having a regular array of image sensing elements and a regular array of first and second colored filter elements registered on the image sensor for producing the sampled color image signal, one sample per image sensing element;

an objective lens for forming a color image on said image sensor;

an optical device including a pair of spaced-apart dichroic mirrors for displacing the first color component of said color image with respect to the second color component by an amount equal to the width of an integral number of image sensing elements such that an image sensing element having a first colored filter element registered thereon and a neighboring image sensing element having a second colored filter element registered thereon receive light from the same portion of the image; and a delay device for synchronizing the sampled color components of the image signal by delaying samples of the first color component of the signal with respect to samples of the second color component by an integral number of samples corresponding to said integral number of image sensing elements, whereby a color image produced from said color image signal is free from color fringing.

2. Apparatus as claimed in claim 1, wherein said spaced-apart, dichroic mirrors are parallel to each other and positioned between said objective lens and said array of color filter elements in said apparatus.

3. Apparatus as claimed in claim 1, further comprising a relay lens positioned in front of said objective lens, and wherein said spaced-apart, dichroic mirrors are angled with respect to each other, and positioned between said relay lens and said objective lens in said apparatus.

4. Apparatus for producing a sampled color image signal having first, second and third sampled color components, including an image sensor having a rectangular array of image sensing elements and regular array of first, second and third subarrays of filter elements, the first and second subarrays having a regular line and column pattern of elements and the third subarray having a checkerboard pattern of elements, the filter elements being registered with the image sensor which is read out one line at a time, one sample per image sensing element for producing the sampled color image signal, the apparatus being characterized by:

a first paid of parallel spaced-apart dichroic mirrors for displacing vertically the first color component of said image with respect to the third color component by the height of one image sensing element and a second pair of spaced-apart dichroic mirrors orthogonal to said first pair for displacing horizontally the second color component by the width of one image sensing element with respect to the first and third color components so as to cause neighboring image sensing elements having differently colored filter elements registered thereon to receive light from the same portion of the image, and first and second delay devices for respectively delaying the first color component of the signal by one line and the second color component by one sample.

5. Apparatus for producing a sampled color image signal having first and second sampled color components, comprising:

an image sensor having a regular array of image sensing elements and a regular array of first and second colored filter elements registered on the image sensor for producing the sampled color image signal;

an objective lens for forming a color image on said image sensor;

a blazed diffraction grating for displacing the first color component of the color image with respect to the second color component by an amount equal to the width of an integral number of image sensing elements, such that an image sensing element having a first colored filter element registered thereon, and a neighboring image sensing element having a second colored filter element registered thereon receive light from the same portion of the image; and a delay device for synchronizing the sampled color components of the image signal by delaying samples of the first color component of the signal with respect to samples of the second color component by an integral number of samples corresponding to said integral number of image sensing elements, whereby a color image produced from said color image signal is free from color fringing.

* * * * *